INVENTOR
RICHARD W. KERN
BY Norman R. Bardales
ATTORNEY

United States Patent Office 3,672,778 Patented June 27, 1972

3,672,778

OPTICAL SYSTEM FOR POSITIONAL AND ANGULAR ORIENTATION DETERMINING APPARATUS

Richard W. Kern, Vestal, N.Y., assignor to International Business Machines Corporation, Armonk, N.Y.

Filed Dec. 9, 1970, Ser. No. 96,417
Int. Cl. G01b *11/26*
U.S. Cl. 356—138 5 Claims

ABSTRACT OF THE DISCLOSURE

A selectively operative relay lens is provided in an optical system which is part of apparatus that determines the positional and angular orientation of an object with respect to a given reference system. When the relay lens is inoperative, the optical system provides an image that is indicative of the position of the object relative to two predetermined reference axes of the reference system and the angular orientation of the object relative to a third reference axis of the system, the three reference axes being mutually orthogonal with respect to each other. When the relay lens is operative, the optical system provides an image which is indicative of the angular orientation of the object relative to the first two mentioned reference axes.

BACKGROUND OF THE INVENTION

Field of the invention

This invention relates to optical systems for positional and angular orientation determining apparatus and is particularly useful when the apparatus is employed for alignment purposes.

Description of the prior art

Heretofore, in certain prior art apparatus, in order to determine the positional and angular orientation of an object with respect to three mutually orthogonal reference axes of a given reference system, two separate optical systems were required. One optical system was configured as an alignment microscope. It was used to determine the position of and/or align the object with respect to two of the reference axes of the reference system, the two reference axes defining a given reference plane. The same optical system was also used to determine the angular orientation of and/or align the object with respect to the third reference axis of the reference system. The second optical system was configured as an autocollimator. It was employed to determine the angular orientation of and/or align the object with respect to the two reference axes defining the aforementioned reference plane. In operation, the determinations and/or alignments of one system was alternately made with those of the other system.

As such, it was required to move the optical systems relative to the object or vice versa to obtain the various determinations and/or alignments of each. Accordingly, when a determination and/or alignment of the position or orientation of the object was made with one optical system, there was a subsequent movement of the object to the other optical system or vice versa, as the case might be, in order to make the other determination with the other optical system. These movements would cause misalignment of the object with respect to the reference parameters associated with the determination provided by the previously employed optical system. A number of relative alternate transitions were required between the object and the two optical systems before final determinations and/or alignments could be made. Not only was this time-consuming, but it was also susceptible to error because of the movement involved. Moreover, the requirement of two separate optical systems was complex and expensive.

SUMMARY OF THE INVENTION

It is an object of this invention to provide a simplified and/or inexpensive optical system in apparatus for determining the positional and angular orientation of an object relative to a three axes reference system.

It is another object of this invention to provide an optical system of the aforementioned kind in which the optical system and object remain substantially stationary with respect to each other.

According to one aspect of the invention, an optical system is provided in apparatus for determining the positional and angular orientation of an object with respect to three mutually orthogonal first, second and third reference axes. The first and second axes lie in a predetermined reference plane. The optical system includes objective lens means having its principal axis normal to the reference plane. A first reticle means is in optical alignment with the objective lens means. The reticle means is disposed in the principal focal plane of the objective lens means of the latter's image space. A second reticle means is in optical alignment with the objective lens means and disposed in a predetermined first imaging plane of the objective means. The aforementioned first imaging plane is located in the image space of the objective lens means such that the aforementioned principal focal plane of the objective lens means is disposed between the objective lens means and the first imaging plane. In addition, there is provided a selectively operative relay lens means. The relay lens means, when operative, is in optical alignment with the objective lens means and disposed between the aforementioned principal focal and first imaging planes. Furthermore, the relay lens means, when operative focuses the first of the aforesaid focal plane at a predetermined second imaging plane. A viewing means is provided for viewing the images at said first and second imaging planes. In operation, the object is positioned in the object space of the objective lens means. When the relay lens means is inoperative, the objective lens means provides an image of the object at the first imaging plane which in coaction with the second reticle means is indicative of the position of the object relative to the first and second reference axes of the reference plane and the relative angular orientation of the object relative to the third reference axis. When the relay lens means is operative, the objective lens means and relay lens means coact with the object to provide an image at the second imaging plane which in coaction with the first reticle means is indicative of the angular orientation of the object relative to the first and second axes.

The foregoing and other objects, features and advantages of the invention will be apparent from the following more particular description of the more preferred embodiments of the invention as illustrated in the accompanying drawing.

BRIEF DESCRIPTION OF THE DRAWING

In the figures, like elements are designated with similar reference numbers.

DESCRIPTION OF THE PREFERRED EMBODIMENTS

Figure 1:
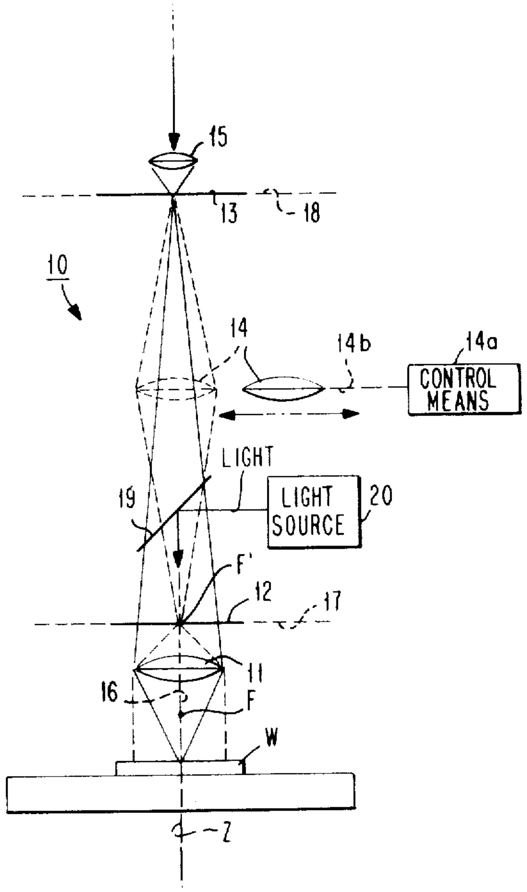
FIG. 1 is a simplified view shown in schematic form of a preferred embodiment of the optical system of the present invention.
Figure 2:
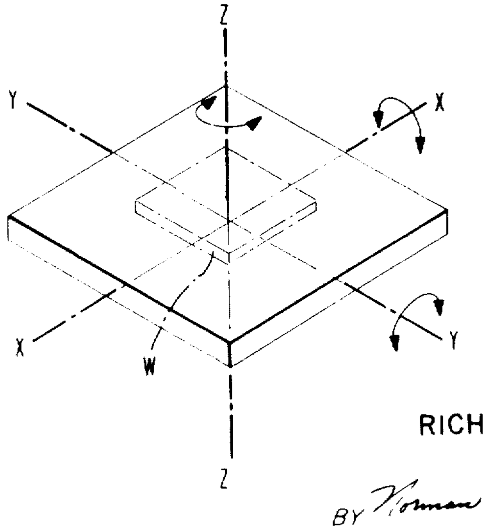
FIG. 2 is a perspective view of an object and a mutually orthogonal three axes reference system.

Referring to FIG. 1, there is shown an optical system 10 which is part of apparatus for determining the positional and angular orientation of an object or workpiece W with respect to three mutually orthogonal reference axes X—X, Y—Y and Z—Z, cf. FIG. 2.

The system 10 basically includes objective lens 11, first and second reticles 12 and 13, respectively, selectively operative relay lens 14 and viewing means such as, for example, eyepiece or ocular lens 15. The principal axis 16 of lens 11 is in parallel alignment with the reference axis Z—Z. Hence, axis 16 is normal to the reference plane defined by the other two reference axes X—X and Y—Y. For sake of clarity, axis 16 is shown as being coincident with axis Z—Z. Points F and F′ represent the principal focal points of lens 11, points F and F′ being in the objective space and image space, respectively, of lens 11. Reticle 12 is in optical alignment with lens 11 and is disposed in the principal focal plane 17 of lens 11 which contains focal point F′. Reticle 13 is also in optical alignment with lens 11 and is disposed in an imaging plane 18 of lens 11.

By way of example, relay lens 14 is made selectively operative by a control means 14a which controls a retractable ram arm 14b, shown schematically as a dash line, to which the lens 14 is attached. As shown in FIG. 1, relay lens 14 is in a retracted position and as such is inoperative with respect to the rest of the optical system 10. For sake of clarity, the relay lens 14 is also shown in dash form in FIG. 1 in its extended or unretracted position and as such is operative, i.e. operating in system 10. When operative, the lens 14 is in optical alignment with the objective lens 11 and is disposed between the focal plane 17 and the imaging plane 18. Furthermore, when operative, the relay lens 14 focuses the field of the focal plane 17 onto a second imaging plane which in the embodiment of FIG. 1 is coincident with the imaging plane 18. The eyepiece 15, in turn, is focused on the coincident imaging planes.

Beam splitter 19 and light source 20 are provided to further enhance the illumination of the workpiece W and reticles 12 and 13.

Referring now to FIGS. 3A–3F, in operation when the relay lens 14 is inoperative, the objective lens 11 provides an image of the object at the imaging plane 18. For purposes of illustration, it will be assumed by way of example that the reticle 13 has a pair of orthogonal cross-hairs which appear as the solid lines 13a–13b when viewed through eyepiece 15, cf. FIG. 3A. It will be further assumed cross-hairs 13a and 13b are aligned in parallel with the reference axes X—X and Y—Y, respectively, cf. FIG. 3A, and that the workpiece W carries correspondingly configured reference indicia which appear as the dash lines 13a′ and 13b′, respectively, when viewed through eyepiece 15, cf. FIG. 3A. In the FIGS. 3A–3F, the reference axes X—X and Y—Y are further illustrated as being coincident with the cross-hairs 13a and 13b, respectively, for sake of clarity and explanation. As aforementioned, the axis Z—Z is coincident with the principal axis 16 of lens 11 as shown in FIG. 1. The workpiece W is positioned in the object space of the objective lens 11 so as to be in focus at the imaging plane 18. It should be noted that when the object is in focus, its positional displacement with respect to the axis Z—Z is fixed and hence determinable. The displacements of the indicia 13a′ and 13b′ from the respective cross-hairs 13a and 13b are indicative of the displacement of the workpiece W with respect to the axes X—X and Y—Y. These displacements are illustrated by the vector displacement arrows 21 and 22, respectively, cf. FIG. 3A. Likewise, the angular orientation of the workpiece W with respect to the reference axis Z—Z, which is normal to the intersection of the axes X—X and Y—Y, is indicated, for example, by the angle $\theta$ formed by the intersection of the vertical cross-hair 13b and the corresponding reference indicia 13b′. As is apparent to those skilled in the art, the optical system may be provided, if desired, with appropriate measuring means, such as by way of example, filar micrometer and goniometer type instrument means, for measuring directly the positional displacements and angular orientation, e.g. linear displacements 21, 22 and angle $\theta$.

Furthermore, as contemplated by the invention, the system 10 may be used to align the workpiece W with reference to axes X—X, Y—Y and Z—Z. For example, assume it is desired to align the workpiece W so that its indicia 13a′ and 13b′ are positioned coincidentally with the cross-hairs 13a and 13b, respectively, when viewed through eyepiece 15. Thus, the workpiece W may, for example, be displaced in the downward direction as indicated by the vector 22, then moved to the left as indicated by the vector 21, cf. FIG. 3A. As a result, the indicia 13a′ and 13b′ are translated to the position shown in FIG. 3B. Next, the workpiece W is rotated through angle $\theta$ about the axis Z—Z in the direction shown by arrow 23, cf. FIG. 3B. As a result, the indicia 13a′ and 13b′ are translated and appear superimposed and coincident with the vertical and horizontal cross-hairs 13a and 13b, respectively, when viewed through eyepiece 15, cf. FIG. 3C.

Figure 3A:
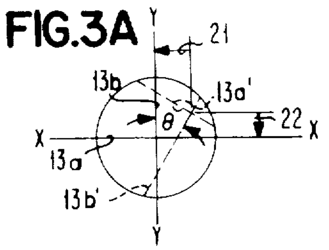
FIGS. 3A–3F are various views of the object as viewed through the optical system of FIG. 1.
Figure 3B:
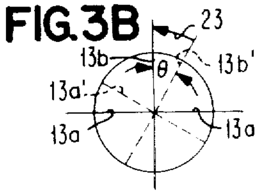
Figure 3C:
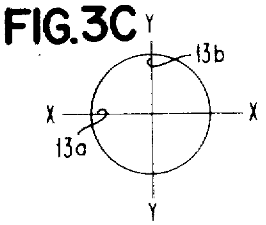
Figure 3D:
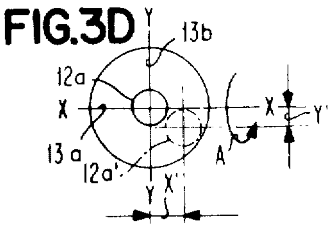

To determine the angular orientations of the workpiece W with respect to the axes X—X and Y—Y, relay lens 14 is made operative. Light rays passing downwardly through the reticle 12 are converted to parallel rays by objective lens 11. In FIG. 1, only the rays which are parallel to the principal axis 16 are shown for sake of clarity. The parallel rays are reflected by the surface of the workpiece W, which surface or an appropriate part thereof may be made flat and reflective for this purpose. Alternatively, the workpiece W may carry an appropriate reflective member. The reflected rays on returning through the lens 11 are focused at the focal plane 17. For purposes of example, it will be assumed that the reticle 12 has a circular configuration as its cross-hair which appears as the solid line circle 12a when viewed through eyepiece 15, cf. FIG. 3D. If the workpiece W is oblique to one or more of the axes X—X or Y—Y, the reflected image of circular cross-hair 12a will appear at the focal plane 17 and at the aforementioned second imaging plane when relayed thereto by relay lens 14. For example, as shown in FIG. 3D, it is assumed that the workpiece W is oblique to both axes X—X and Y—Y, and that the resulting reflected image 12a′, shown in dash line for sake of clarity, of cross-hair 12a appears as shown therein. The angular orientation of the workpiece W with respect to the axes X—X and Y—Y is thus indicated by the respective linear displacements X′ and Y′ of the image 12a′ with respect to the circular cross-hair 12a. Again the optical system 10 may be provided, if desired, with appropriate filar micrometer type instrument means for measuring the displacements X and Y with respect to the circular cross-hair 12a and providing a correlated measurement of the angular displacements of the object W with respect to the axes X—X and Y—Y.

Furthermore, as anticipated by the invention, system 10 may be used to align the workpiece W with respect to axes X—X and Y—Y with particular angular orientations. For example, assume it is desired to align the workpiece W so that it lies in the reference plane defined by the reference axes X—X and Y—Y. Thus, the workpiece W may, for example, first be rotated in the direction indicated by arrow A about the axis X—X until the image 12*a′* is centered on the axis X—X as viewed through eyepiece 15, cf. FIG. 3E. Next, the workpiece W is rotated in a direction indicated by the arrow B about the axis Y—Y until the image 12*a′* is centered on the axis Y—Y and hence superimposed with the cross-hair 12*a*, cf. FIG. 3F.

As is readily seen from the foregoing, the object W and the optical system 10 remain stationary with respect to each other, i.e. in one work station, during the various determinations of the object's positional and angular orientation and hence stationary with respect to the three reference axes. As a consequence, there is a resulting saving of time, space and/or mitigation of the possibility of error when making the various determinations. Furthermore, the optical system 10 allows the features of a microscope alignment instrument and autocollimator to be combined in one optical system using a common objective lens and viewing means.

Figure 3E:
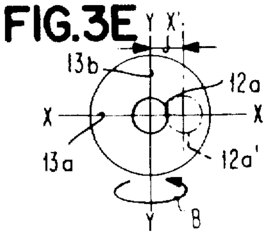
Figure 3F:
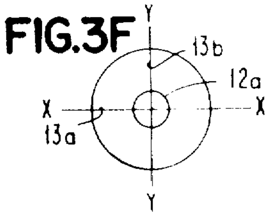

In FIGS. 3D–3E, the cross-hairs 13*a*, 13*b* of reticle 13 appear to the viewer as being superimposed with the cross-hair 12*a* of reticle 12 when relay lens 14 is operative. By judiciously selecting one or more of the cross-hair characteristics, e.g. color, configuration, geometry, etc., appreciable distinction may be made between the two so that cross-hairs of reticle 13 are not confused for those of reticle 12 or vice versa by the viewer. If desired, however, when the relay lens 14 is operative, the reticle 13 may be rendered inoperative, e.g., by removing it to a position out of the optical path of system 10.

On the other hand, the other reticle 12 need not be rendered inoperative during the period that relay lens 14 is inoperative. As is readily apparent, the lens 14 when inoperative is incapable of focusing the reticle 12 and the resultant reflected image 12*a′*, which are located at focal plane 17, onto the imaging plane 18. Thus, in this last case, since the reticle 12 or its reflected image does not appear in imaging plane 18 to the viewer, it hence cannot be confused with the other reticle 13.

Figure 4:
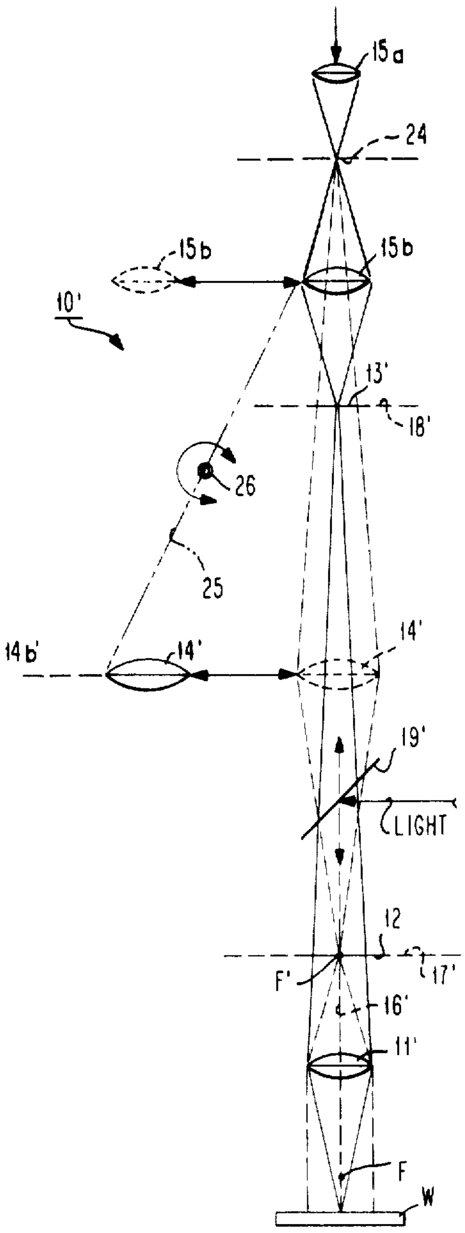
FIG. 4 is a simplified view shown in schematic form of another embodiment of the invention.

Referring now to FIG. 4, there is illustrated another embodiment of the present invention which allows the reticle 13′ thereof to be selectively operative without moving the reticle 13′ per se in and out of the optical system 10′. Reticle 13′ corresponds to the reticle 13 of FIG. 1. In the embodiment of FIG. 4, the imaging plane 18′ of the objective lens 11′ and the imaging plane 24 of the selectively operative relay lens 14′ are separated, i.e. are not coincident. As aforementioned, the corresponding imaging planes of the corresponding lenses 11 and 14 of FIG. 1 are coincident. For the particular embodiment of FIG. 4, the viewing means includes ocular lens 15*a* and a selectively operative relay lens 15*b*.

When lens 15*b* is operative as shown by its solid outline form in FIG. 4, it is in optical alignment with the principal axis 16′ of lens 11 and is disposed between the imaging planes 18′ and 24 so as to focus the field of the imaging plane 18′, in which the reticle 13′ lies, onto the imaging plane 24. Also, when lens 15*b* is operative, lens 14′ is inoperative as shown by the solid outline form of lens 14′ in FIG. 4. As such, the cross-hair, not shown, and/or corresponding reflected image, not shown, of reticle 12′ do not appear to the viewer through eyepiece 15*a*, but the cross-hairs, not shown, of reticle 13′ and/or the image, not shown, of the corresponding reference indicia, not shown, of the workpiece W do appear to the viewer through the eyepiece 15*a*.

On the other hand, when the lens 15*b* is inoperative, lens 14′ is operative as illustrated by their respective dash line forms in FIG. 4. As such, the cross-hair, not shown, of reticle 13′ and/or the image, not shown, of the corresponding reference indicia, not shown, of the workpiece W do not appear to the viewer through eyepiece 15*a*; whereas, the cross-hairs, not shown, and/or corresponding reflected image, not shown, of reticle 12′ do appear.

By way of example, the relay lens 15*b* may be connected to the lens 14′ by a suitable linkage and pivot means, shown as dash line 25 and pivot 16. Lens 14′ is made inoperative by placing it in a retracted position via control means, not shown, connected to retractable arm 14*b′*. As a result, linkage and pivot means 25–26 places lens 15*b* into an extended position; and hence, lens 15*b* is operative. To make lens 14′ operative, it is placed in its extended position via the control means, not shown; and as a consequence, lens 15*b* is rendered inoperative by being withdrawn to its retracted position via means 25–26.

Figures 5, 6:
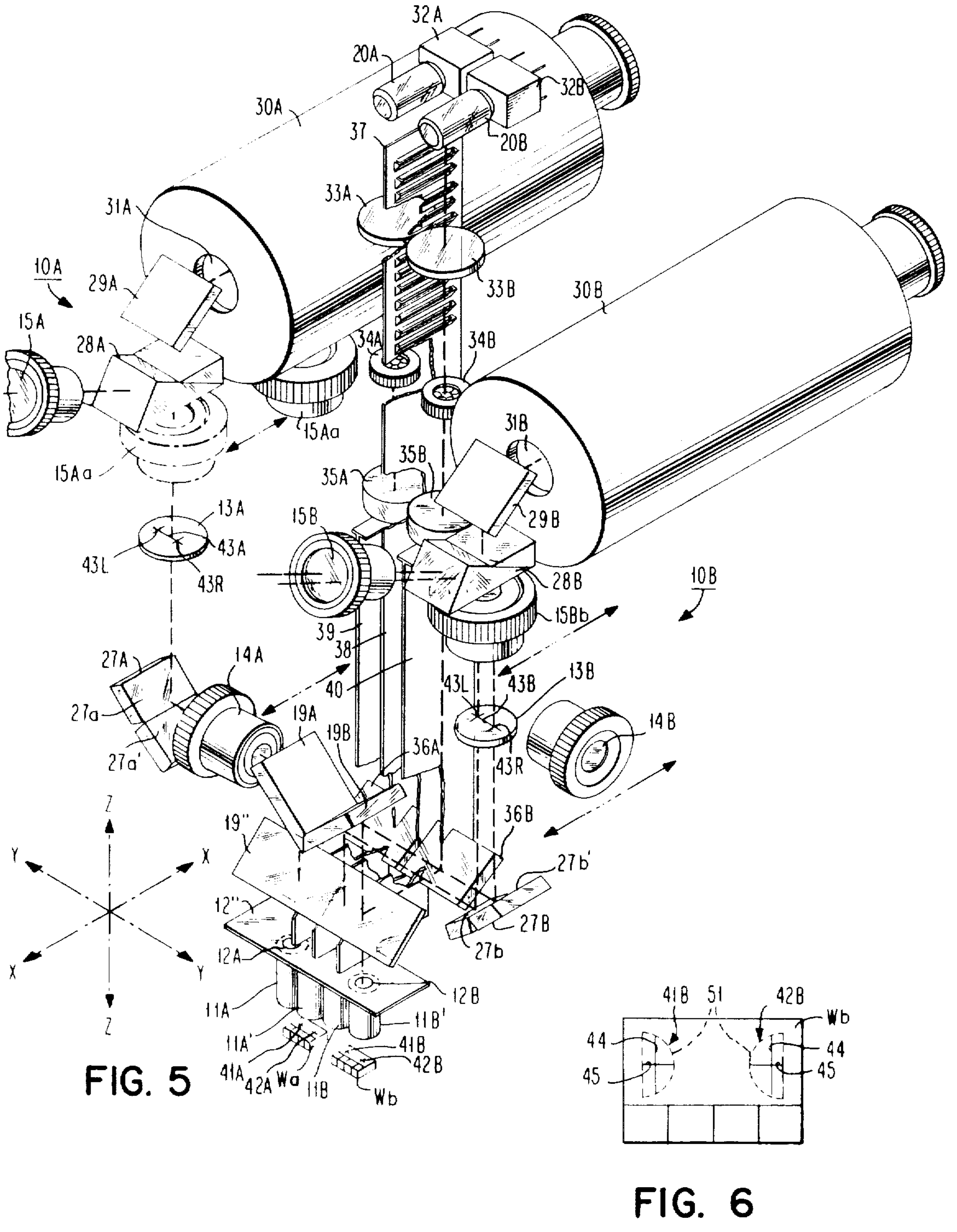
FIG. 5 is a perspective and exploded view, partially broken away, of still another embodiment of the invention.
FIG. 6 is a plan view of one of the objects of FIG 5.

Referring now to FIG. 5, there is illustrated two identical optical systems 10A and 10B of another embodiment of the present invention. These two systems 10A and 10B are used to determine and/or align the respective positional and angular orientations of two objects or workpiece W*a* and W*b*, respectively, with respect to a common three axes reference system X—X, Y—Y, Z—Z, and hence with respect to each other. The systems 10A and 10B are accordingly mounted with a fixed relationship with respect to each other and the three axes reference system. Each of the systems 10A and 10B is configured somewhat similar to the system 10′ of FIG. 4, and each operates independently with respect to the other. For sake of clarity, however, only one system 10B is herein described.

System 10B includes two parallel aligned, identical objective lenses 11B, 11B′, which are focused on two separated fields of workpiece W*b*. By providing images of the workpiece W*b* at two separated fields, the determination of the angular orientation of the workpiece W*b* with respect to axis Z—Z is enhanced as will be explained hereinafter. Located in the respective principal focal plane of the outer lens 11B′ is a reticle cross-hair 12B. The cross-hair 12B is configured, for example, as an opaque circle located on a common transparent member 12″. The transparent member 12″ also carries the reticle cross-hair 12A associated with the outer lens 11A of the other system 10A.

The lenses 11B and 11B′ focus the separated fields of the object W*b* at a common imaging plane, which contains the reticle 13B. More particularly, there is provided an appropriate light path folding means that comprises a common beam splitter 19″, reflector 19B, and the appropriate inclined reflective surfaces 27*b* and 27*b′* of reflector 27B. The angle of inclination of surfaces 27*b* and 27*b′* is such that the respective separated images provided by lenses 11B and 11B′ are focused at the respective centers 13L and 13R of the H-shaped cross-hair 43B of reticle 13B.

A selectively operative relay lens 15B*b* focuses the two fields of the last mentioned imaging plane containing the reticle 13B to a second imaging plane with which the eyepiece 15B is also in focus. As shown in FIG. 5, the viewing means of system 10B also includes a prism and beam splitter member 27B. The optical path is folded by the prism and beam splitter member 28B so that lens 15B can be inclined. Also included in the viewing means of system 10B are a reflector 29B and a vidicon camera 30B which is part of a closed circuit TV system, not shown. The beam splitter member 28B also passes the two fields of the last mentioned imaging plane onto the inclined reflective member 29B, which reflects them in turn into the faceplate 31B of the vidicon tube or camera 30B.

Also provided in system 10B is a selectively operative relay lens 14B, which in the system of 10B is shown as being inoperative. For sake of comparison, the corresponding relay lens 14A of system 10A is shown in FIG. 5 as being operative. Moreover, lens 15B*b* of system 10B is shown in FIG. 5 as being operative; whereas, the corresponding relay lens 15A*a* of system 10A is shown in its solid outline form as being inoperative. In the manner similar to the embodiment of FIG. 4, when relay lens 14B is operative, relay lens 15B*b* is inoperative and vice versa. Accordingly, when relay lens 14B is operative, by virtue of its position between the member 19B and the surface 27b′ of member 27B, it focuses an image of the field containing the respective principal focal plane of lens 11B′, and hence the reticle cross-hairs 12B, onto the aforementioned second imaging plane associated with system 10B.

Each of the systems 10A and 10B is provided with separate, identical illuminating sources. For example, the system 10B is provided with an illuminating source which includes a quartz lamp 20B having a suitable electrical socket 32B. The light from lamp 20B is passed through a series of optical elements, which are part of the illuminating source and which include condenser lens 33B, iris 34B, condenser lens 35B, reflector 36B and beam splitter 19″. Also included in the illuminator source is a light divider member 37 that is provided with a center section 38 which isolates the light from lamp 20A and 20B to their respective systems, 10A and 10B. Member 37, in addition, is further provided at its lower end with two L-shaped outer sections, 39 and 40. Center section 38 is also L-shaped at its lower end. Section 39 divides the light from lamp 20A into two isolated paths, each illuminating one of lenses 11A and 11A′, respectively. Section 40 does the same with the light from lamp 20B with respect to the lenses 11B and 11B′.

The operation of each optical system 10A and 10B of FIG. 5 is similar to the operation in the embodiment shown in FIG. 4 except that separated views of the object W are provided to enhance the determination of the angular orientation of the object with respect to axis Z—Z. As shown in greater detail in FIG. 6, each of the two separated optical reference indicia 41B and 42B of workpiece W*b* is configured as one-half of the corresponding reticle H-shaped cross-hair 43B, cf. FIG. 5, of reticle 13B. The indicia 41B and 42B have corresponding parallel vertical portions 44 and parallel horizontal portions 45, the latter being in linear coincidence. Accordingly, when viewed by the viewing means of system 10B and with lenses **15B*b* and 14B operative and inoperative, respectively, the images of the separated indicia 41B and 42B** will appear juxtaposed to each other as will be apparent from the description of FIGS. 7A–7C hereinafter.

Figure 7A:
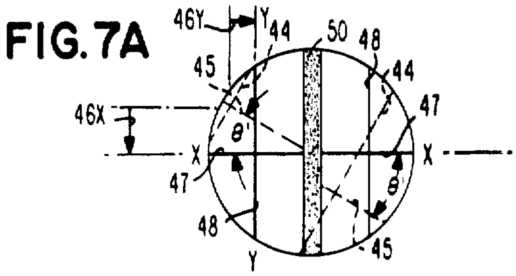
FIGS. 7A–7E are various views of the object of FIG. 6 as viewed through one of the optical systems of FIG. 5.
Figure 7B:
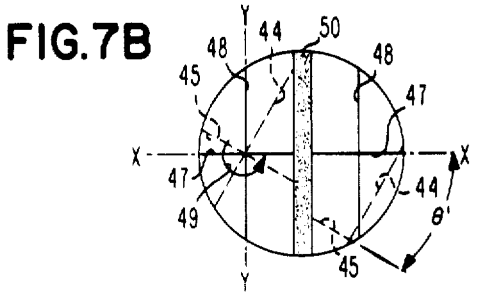
Figure 7C:
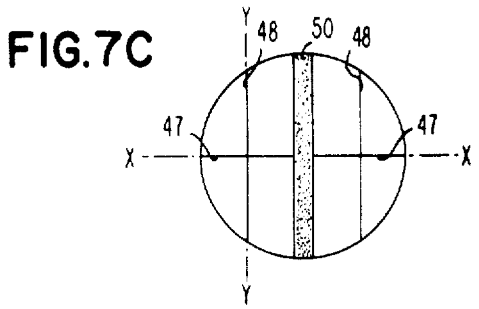

Referring now to FIGS. 7A–7C, it is assumed for purposes of explanation that relay lenses 15Bb and 14B are operative and inoperative, respectively. It is assumed that the workpiece Wb has a positional orientation with respect to the axes X—X and Y—Y and angular orientation in the plane defined thereby such that the indicia 44 and 45, shown in dash lines for sake of clarity, appear to the viewer through eyepiece 15B, in the manner shown in FIG. 7A. More specifically, in FIG. 7A, the object W*b* has a positional displacement, e.g. displacement 46X, to the axis X—X and a positional displacement, e.g. displacement 46Y, to axis Y—Y. These displacements are proportional to the distances of the intersection of the indicia 44 and 45 from the horizontal and vertical cross-hair portions 47 and 48, respectively, of cross-hairs 43B taken from the left image as viewed in FIG. 7A. Its angular displacement in the reference plane, which is defined by reference axes X—X and Y—Y, is indicated by the angle $\theta'$ and which angular displacement is greatly enhanced in the right image as viewed in FIG. 7A. Translation of the object W*b* as indicated by vectors 46X and 46Y results in the intersection of indicia 44 and 45 being aligned with the intersection of cross-hair portion 47 and 48 in the left image as shown in FIG. 7B. Rotation of the object W*b* about the intersection of the portions 44 and 45 of indicia 42B in the plane defined by axes X—X and Y—Y, through angle $\theta'$ in the direction indicated by arrow 49 in 7B, results in the indicia 44 and 45 being aligned with cross-hair vertical portion 48 and horizontal portion 47, respectively, as shown in FIG. 7C. Separation of the left and right images in each of the FIGS. 7A–7C is shown schematically by the shaded region 50, which represents the area of the workpiece W*b* which is not illuminated by the illuminating source. In FIG. 6, the separated areas of the workpiece W*b* which are illuminated occur within the dash line half circles 51. The aforementioned illuminating source is judiciously designed to restrict the illumination within the separated half circle configurations. In practice, the region 50 appears as a sharp opaque line when viewed through the viewing means.

Figure 7D:
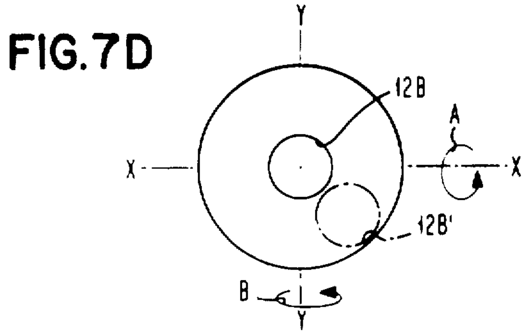
Figure 7E:
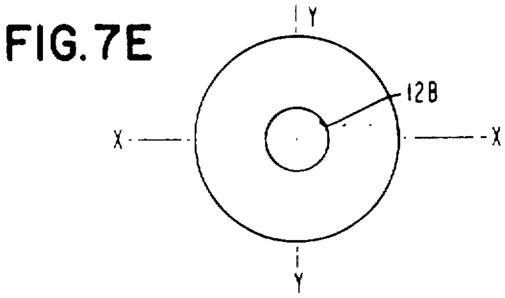

Referring now to FIG. 7D, it is assumed that the object W*b* has an oblique angular orientation with respect to the axes X—X and Y—Y of the reference system. In accordance with the principles of the present invention, in order to determine these angular orientations, the relay lenses **15B*b* and 14B are made inoperative and operative, respectively. As a consequence, only outer lens 11B′ is effectively operated. For the assumed angular orientations, the image 12B′ of reticle cross-hair 12B when viewed through the viewing means of system 10B appears displaced from cross-hair 12B** as shown in FIG. 7D. This displacement is indicative of the angular orientation of the object with respect to axes X—X and Y—Y. Alignment of the object W*b* is accomplished by appropriately rotating, cf. arrows A and B of FIG. 7D, the object Wb about each of the axes X—X and Y—Y, so that the reflected image 12B′ and reticle cross-hair 12B are superimposed, as shown in FIG. 7E, when viewed by the viewer.

It should be understood that in each of the various embodiments, appropriate housing means, not shown for sake of clarity, is provided to maintain the various elements of the described optical system and apparatus in the appropriate relationships with respect to each other. In addition, the apparatus may be provided with automatic alignment means for aligning the object when being observed by a viewer through the particular optical system.

While the invention has been particularly shown and described with reference to preferred embodiments thereof, it will be understood by those skilled in the art that various changes in form and details may be made therein without departing from the spirit and scope of the invention.

I claim:

1. In apparatus for determining the positional and angular orientation of an object with respect to three mutually orthogonal first, second and third reference axes, said first and second axes lying in a predetermined reference plane, an optical system comprising in combination:

objective lens means having the principal axis thereof normal to said reference plane;

first reticle means in optical alignment with said objective lens means and disposed in the image space principal focal plane of said objective lens means;

second reticle means in optical alignment with said objective lens means and disposed in a predetermined first imaging plane of said objective lens means located in the image space thereof, said principal focal plane being disposed between said objective lens means and said first imaging plane;

selectively operative relay lens means, said relay lens means when operative being in optical alignment with said objective lens means and disposed between said principal focal plane and said first imaging plane to focus the field of said principal focal plane at a predetermined second imaging plane of said relay lens means;

means for viewing the images at said first and second imaging planes; and means for positioning said object in the object space of said objective lens means, said objective lens means providing an image of the object at said first imaging plane which in coaction with said second reticle means is indicative of the position of said object relative to said first and second reference axes of said reference plane and the relative angular orientation of said object relative to said third reference axis when said relay lens means is inoperative, and said objective lens means and said relay lens means coacting with said object to provide an image of said first reticle means at said second imaging plane which in coaction with said first reticle means is indicative of the angular orientation of said object relative to said first and second axes when said lens means is operative.

2. Apparatus according to claim 1 wherein said first and second imaging planes are coincident, and said means for viewing comprises ocular lens means focused on said imaging planes.

3. Apparatus according to claim 1 wherein said first and second image planes are spaced apart, and said means for viewing comprises:

ocular lens means focused on said second imaging plane, and selectively operative second relay lens means, said second relay lens means when operative being disposed between said first and second imaging planes to focus the field of said first imaging plane onto said second imaging plane;

said first mentioned selectively operative relay lens being inoperative when said second operative relay lens means is operative and vice versa.

4. Apparatus according to claim 1 wherein said second reticle means is selectively operative.

5. Apparatus according to claim 1 wherein said objective lens means further comprises two objective first and second lenses for focusing two first and second spaced fields, respectively, of said object, said first lens providing said image of said second reticle means for viewing when said relay lens means is operative, said first and second lens coactively providing said image of said object as a split image for viewing concurrently said first and second fields when said relay lens means is inoperative.

References Cited

UNITED STATES PATENTS

| | | | |
|---|---|---|---|
| 3,418,037 | 12/1968 | Welham | 356—138 X |
| 3,502,415 | 3/1970 | Hock | 356—172 X |

RONALD L. WIBERT, Primary Examiner

F. L. EVANS, Assistant Examiner

PO-1050
(5/69)

UNITED STATES PATENT OFFICE
CERTIFICATE OF CORRECTION

Patent No. 3,672,778 Dated June 27, 1972

Inventor(s) Richard W. Kern

It is certified that error appears in the above-identified patent and that said Letters Patent are hereby corrected as shown below:

Column 9, line 8, before "lens" insert --relay--.

Signed and sealed this 2nd day of January 1973.

(SEAL)
Attest:

EDWARD M.FLETCHER,JR.
Attesting Officer

ROBERT GOTTSCHALK
Commissioner of Patents